March 21, 1939.  F. ELLINGSEN  2,151,294
PIVOT PIN
Filed March 23, 1937
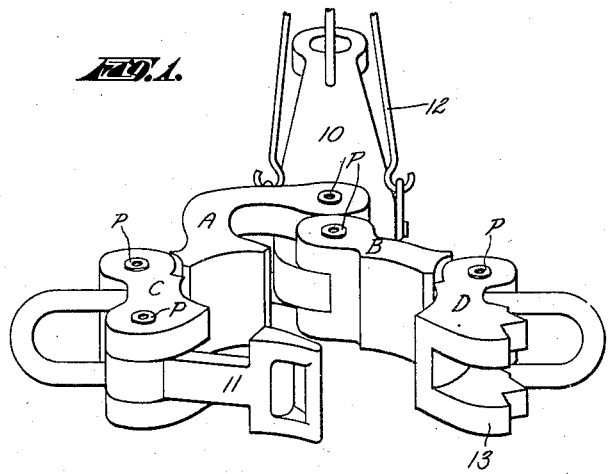
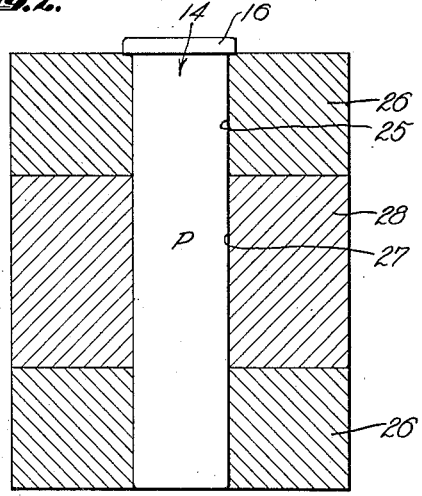
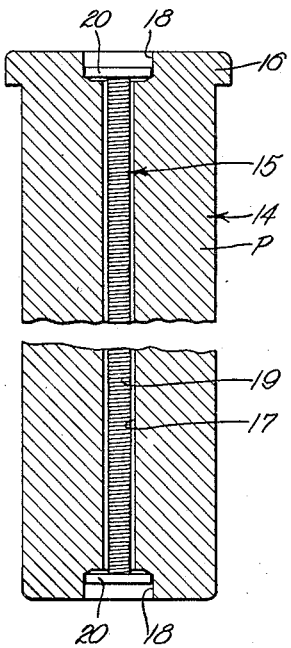
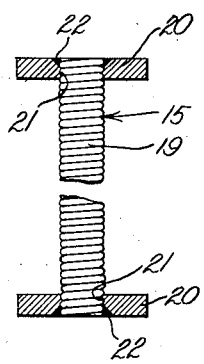
Inventor
FRANK ELLINGSEN
By
His Attorney Patented Mar. 21, 1939

2,151,294

UNITED STATES PATENT OFFICE 2,151,294

PIVOT PIN

Frank Ellingsen, Brea, Calif., assignor to Chicksan Oil Tool Company, Ltd., Fullerton, Calif., a corporation of California Application March 23, 1937, Serial No. 132,548

4 Claims. (Cl. 308—37)

This invention relates to a pintle pin or pivot pin and relates more particularly to a pin of this character suited for use in situations where the loss or detachment of a machine part may have series consequences. A general object of this invention is to provide a simple, dependable hinge pin, pintle pin or pivot pin whose parts or fragments cannot fall or become detached from the tool or machine in the event of failure or breakage of the pin.

The machine part or pin provided by the present invention has many uses and applications. In order to simplify the present disclosure I will describe a typical form of the invention employed in a well tool or a tool often used in well drilling operations. It is to be understood that the invention is not to be taken as limited to this particular use or application, as it is merely typical of the many useful applications of the invention.

In well drilling operations it is necessary to handle and operate various tools at the mouth of the well. For example, tongs are employed to grip and hold the drill pipe, well casing etc., at the mouth of the well. During such operations parts sometimes break and become detached from the tools and fall into the well. The pivot pins connecting the segments of sections of tongs quite frequently break and parts of the pins sometimes fall into the well bore. The loss of such parts in a well is often quite serious, necessitating expensive time consuming fishing operations to recover parts from the well before drilling operations can be resumed.

Another object of this invention is to provide a pivot pin that cannot become lost or separated from the machine or tool in which it is employed in the event the pin breaks or parts.

Another object of this invention is to provide a pivot pin embodying means for preventing the complete disconnection of any of its pieces or parts in the event of failure of the pin, thereby preventing loss of the pin parts from the machine or tool.

Another object of this invention is to provide a pivot pin of the character mentioned in which the means for preventing the complete disconnection of its parts in the event of failure allows one part of the broken pin to hang or project from the machine or tool to inform the operator of the failure of the pin.

Another object of this invention is to provide a pivot pin of the character mentioned that is adapted for use in practically any situation where typical pivot pins, hinge pins, pintle pins and the like are used.

A further object of this invention is to provide a pivot pin of the character mentioned that is simple and inexpensive and that is strong and durable.

The various objects and features of my invention will be fully understood from the following detailed description of a typical preferred form and application of the invention, throughout which description reference is made to the accompanying drawing, in which:

Fig. 1 is a perspective plan view of a well casing tongs embodying pivot pins of the invention. Fig. 2 is an enlarged vertical sectional view of the tongs illustrating a pin of the invention pivotally connecting two tool parts. Fig. 3 is an enlarged longitudinal detailed sectional view of a pivot pin of the invention showing the spring and the washers in elevation, and Fig. 4 is a side elevation of the spring removed from the pin illustrating the washers in cross-section.

As pointed out above the invention may be embodied in forms of pins suitable for use in various situations and in connection with the elements of various classes of machines, tools etc. In the following detailed description the invention will be disclosed as embodied in pivot pins employed as elements of a casing tongs of the character employed in well drilling rigs. The tongs illustrated in Fig. 1 includes a handle 10, a plurality of jaw sections A, B, C and D and a latch 11 for latching the jaw sections about a well casing or the like. The tongs is a heavy tool and is normally suspended by bails 12 connected with the handle 10 to hang in a substantially horizontal position. The jaw sections A and B are pivotally connected with the inner end of the handle 10, while the jaw section C is pivotally connected with the outer end of the section A and the jaw section D is pivotally connected with the outer end of the section B.

The jaw sections A and B are connected with the handle 10 by pins P of the invention and the jaw sections C and D are pivotally connected with the sections A and B respectively, by pivot pins P of the character provided by the invention. The latch 11 is provided to releasably connect the outer end of the jaw section C with the outer end of the jaw section D, to hold the several sections assembled about the casing to grip the same. The latch 11 may be pivotally connected with the section C by a pivot pin P provided by the invention. In the typical tongs illustrated the latch 11 is substantially T-shaped and is adapted to releasably engage spaced catches 13 on the jaw section D to hold the jaw sections assembled about the casing. The several pins P embodied in the tongs may be identical and the following detailed description of the pivot pin of the invention is equally applicable to the several pins P.

The improved pivot pin of the invention includes, generally, a body 14, and yieldable means 15 connecting the opposite ends of the body 14.

The pin body 14 may be shaped and proportioned to adapt the pin for use in any specified installation. In the typical form of the invention illustrated the body 14 is a simple, elongated cylindrical part. The body 14 is integral and is preferably provided at one end with suitable means for preventing its displacement from the tool. In the case illustrated, this means consists of a rim or head 16. The head 16 is an integral part of the body 14 and is adapted to engage the upper side of a tong section to prevent the pin from dropping from its openings in the tong parts. The tongs is a heavy tool and always remains in a substantially horizontal position as illustrated, so that the head 16 of the pin body 14 is sufficient to prevent the loss of the pin P from the tongs. However, where the pin is to be used in other devices it is obvious that any suitable or typical means may be provided on the pin body 14 to prevent end-wise displacement of the pin in both directions. In accordance with the invention the body 14 is tubular, having a central longitudinal opening 17. The opening 17 extends through the body 14 from one end to the other and the invention provides counter-bores or sockets 18 at opposite ends of the opening. The opening 17 is preferably small in diameter relative to the diameter of the body 14 so that the opening does not materially weaken the body. It will be observed that the pin body 14 is simple and inexpensive to manufacture.

The means 15 is an important feature of the invention. The means 15 is provided to prevent the complete disconnection of the end parts of the pin body 14 in the event that the body 14 breaks and the means 15, therefore, operates to prevent the loss or falling of any of the pin parts from the tongs in the event that the pin fails. The means 15 includes a flexible or extensible element arranged longitudinally in the opening 17. In the preferred construction illustrated, this extensible element is a coiled spring 19. The spring 19 extends through the opening 17 with suitable clearance and may be such that its convolutions are normally closed, as illustrated. In practice the spring may be of sufficient length to have its opposite ends at the sockets 18.

Parts are provided on the opposite ends of the spring 19 to cooperate with the sockets 18 for the purpose of associating or connecting the spring with the end portions of the pin body 14. In practice it has been found desirable to secure washers 20 to the ends of the spring 19. The washers 20 are adapted to cooperate with the bottom walls of the sockets 18 to prevent the displacement of the spring 19 from the opening 17 and to associate the spring 19 with the end portions of the pin body 14 so that the spring prevents their complete disconnection in the event of failure of the pin. The washers 20 are preferably rigidly and permanently secured to the ends of the spring 19. The end portions of the spring 19 are received in the openings 21 of the washers 20 and welds 22 secure the washers 20 to the spring at the outer ends of the openings 21. In manufacturing or assembling the improved pin P, one washer 20 may be secured to the spring 19 by a weld 22 and the spring 19 may then be inserted in the opening 17 to have the said washer 20 received in one of the sockets 18. The spring 19 is proportioned so that its end will project into the other socket 18 and the second washer 20 is secured to the end of the spring by a weld 22. The sockets 18 are of sufficient depth to entirely receive the washers 20. In the case illustrated the sockets 18 are of such depth that the washers 20 are counter-sunk or inset some distance from the ends of the pin body 14.

Fig. 2 of the drawing illustrates an improved pin P of the invention arranged in place to pivotally connect two parts or sections of the tongs illustrated in Fig. 1. The pin P is arranged through openings 25 in the spaced parts 26 of one tong section and through an opening 27 in a tongue 28 of another tong section. The pin P arranged through the openings 25 and 27, of course, pivotally connects the two parts or sections of the tongs. The head 16 on the upper end of the pin body 14 rests on the upper-most part 26. It will be observed that the above described means 15 does not interfere with the insertion of the pin P in the openings 25 and 27 and does not require modification of any parts of the tongs.

In use or operation the pins P operate in the same manner as typical or common pivot pins. The springs 19 are completely housed in the opening 17 and the washers 20 are counter-sunk in the sockets 18 so that the spring and washers are not liable to be injured during use or operation of the tongs. As illustrated in Fig. 2, the pins P may be proportioned so that their lower ends are normally substantially flush with the lower sides of the tong parts or sections. The pins P of the tongs are subjected to very severe stresses and heavy wear and, therefore, are liable to break between their ends when the tool is in use at the mouth of the well. In the event of such failure of a pin P the lower portion of the parted pin, of course, tends to fall by gravity. The spring 19 having the washers 20 at its opposite ends prevents this parted lower fragment or section of the broken pin from falling from the tongs. It will be evident that the washers 20 on the opposite ends of the spring 19 cooperate with the bottom walls of the sockets 18 in such a manner that the spring 19 assumes the weight of the lower piece or part of the broken pin. The spring 19 is sufficiently strong to sustain the weight of the broken-off lower part of the pin P and thus prevents the said part from falling from the tongs and from entering the mouth of the well. It is preferred, however, that the spring 19 be such that it stretches or becomes elongated under the weight of the broken-off lower portion of the pin P to allow the said portion of the pin to project from the lower side of the tongs. The operator, seeing this part of the pin projecting from the lower side of the tongs, is made aware of the fact that the pin P has broken and may take the proper steps for the removal of the broken pin and its replacement.

Having described only a typical preferred from and application of my invention I do not wish to be limited or restricted to the specific details set forth, but wish to reserve to myself any variations or modifications that may appear to those skilled in the art or may fall within the scope of the following claims:

Having described my invention, I claim:

1. A pivot pin of the character described including, an elongate body, the body having a longitudinal opening, an extensible spring extending through the opening, and parts on the spring engaging the end portions of the body whereby the spring prevents complete disconnection of said end portions in the event of failure of the body.

2. A pivot pin of the character described including, an elongate body, the body having a longitudinal opening, an extensible spring extending through a major portion of the opening, and parts on the spring engaging the end portions of the body whereby the spring prevents complete disconnection of said end portions in the event of failure of the body, there being sockets in the ends of the body receiving said parts.

3. A pivot pin of the character described including, an elongate body, the body having a longitudinal opening and sockets at the ends of the opening, an extensible coiled spring extending through said opening to have its ends at said sockets, and parts secured to the end portions of the spring and cooperating with the sockets whereby the spring prevents complete separation of the parts of the body in the event of failure of the same.

4. A pivot pin of the character described including, an elongate body, the body having a longitudinal opening and sockets at the ends of the opening, an extensible coiled spring extending through said opening to have its ends at said sockets, and washers welded to the spring and received in the sockets whereby the spring prevents complete separation of the parts of the body in the event of failure of the same.

FRANK ELLINGSEN.